United States Patent [19]

Shinbori et al.

[11] Patent Number: 5,349,600
[45] Date of Patent: Sep. 20, 1994

[54] SOLID STATE LASER

[75] Inventors: Osamu Shinbori, Tokyo; Yoshinori Mimura, Wako; Yukio Noda, Hatoyama-Saitama; Tetsuya Nakai, Tokyo, all of Japan

[73] Assignee: Kokusai Denshin Denwa Kabushiki Kaisha, Tokyo, Japan

[21] Appl. No.: 116,323

[22] Filed: Sep. 3, 1993

[30] Foreign Application Priority Data

Sep. 21, 1992 [JP] Japan .................. 4-274924

[51] Int. Cl.⁵ .................. H01S 3/08; H01S 3/091
[52] U.S. Cl. .................. 372/92; 372/99; 372/101; 372/70; 372/69; 372/75; 372/66; 372/39
[58] Field of Search .................. 372/39, 40, 41, 43, 372/50, 69, 70, 72, 75, 66, 92, 98, 99, 109, 101, 19

[56] References Cited

U.S. PATENT DOCUMENTS

| | | |
|---|---|---|
| 3,684,980 | 8/1972 | Kay .................. 372/75 X |
| 3,821,663 | 6/1974 | Brenner .................. 372/75 X |
| 4,756,002 | 7/1988 | Ruggieri et al. .................. 372/75 X |
| 4,897,850 | 1/1990 | Crosby .................. 372/92 X |
| 4,969,155 | 11/1990 | Kahan .................. 372/75 X |
| 4,993,038 | 2/1991 | Nakano et a. .................. 372/92 |
| 5,033,058 | 7/1991 | Cabaret et al. .................. 372/92 X |
| 5,172,388 | 12/1992 | Long et al. .................. 372/70 |
| 5,181,223 | 1/1993 | Baer .................. 372/75 X |
| 5,271,031 | 12/1993 | Baer .................. 372/93 |

*Primary Examiner*—Brian Healy
*Attorney, Agent, or Firm*—Emmanuel J. Lobato

[57] ABSTRACT

A high-output, single fundamental transverse mode solid state laser is disclosed which uses a semiconductor laser array as an excitation light source. The solid state laser comprises: a laser element which includes a core containing an element added as a laser medium, a cladding containing no such laser medium element, and reflecting mirrors coated over the cladding surface for repeatedly reflecting incident excitation light so that it may repeatedly pass through the core; an excitation light source formed by semi-conductor laser or light emitting diode array; means for guiding the excitation light from the excitation light source to one side of the laser element for incidence thereto; and a resonator for the oscillation of the solid state laser.

6 Claims, 8 Drawing Sheets

SOLID STATE LASER

BACKGROUND OF THE INVENTION

The present invention relates to a solid state laser which emits laser light by dint of the energy of excitation light incident to one side of its laser element.

FIGS. 10A and 10B illustrate in combination a side excitation type solid state laser which is excited by semiconductor laser light incident to one side of the laser element, FIG. 10A being a plan view and FIG. 10B its cross-sectional view. Reference numeral 7 denotes a semiconductor laser for excitation use, 8 a solid state laser element, 9 a concave mirror which has a reflectivity of 99% or more with respect to the wavelength of the solid state laser, and 10 a plane mirror which has a transmittivity of 10% or so. The concave mirror 9 and the plane mirror 10 constitute a resonator. Reference numeral 11 indicates a reflecting mirror whereby excitation light having passed through the laser element is reflected back thereinto, the hatched part indicating an area where the excitation light is absorbed. Reference numeral 6 denotes a laser beam.

The side excitation type solid state laser has its feature in that the output can be increased simply by increasing the number of semiconductor lasers for excitation use, without the necessity of using any special optical systems, and that the energy of excitation light is absorbed in the direction of the optical axis of the laser element. Hence the side excitation type solid state laser is considerably low in the non-uniformity of a temperature rise like an end face excitation type solid state laser and suitable for use as a high output solid state laser.

The side excitation type solid state laser has a defect of low excitation efficiency, especially in a single fundamental transverse mode of operation.

That is, since the conventional solid state laser element has its laser medium uniformly added thereto, the excitation light incident to the laser element is also absorbed in other regions than the laser region as shown in FIG. 10B. The energy of the excitation light which contributes to the laser oscillation is a part of the total energy of the incident excitation light and the ratio of the energy of the excitation light for laser oscillation to the total energy of the incident excitation light is particularly low, resulting in the excitation efficiency being impaired.

Moreover, since the reflecting mirror attached to the conventional laser element usually covers its side only up to about 50% of the total side surface area, the incident excitation light is reflected back and forth only once in the laser element and the excitation efficiency cannot radically be improved.

Besides, the conventional side excitation type solid state laser using semiconductor lasers has a shortcoming that the laser element containing a laser medium of a low absorption coefficient is very difficult of oscillation.

SUMMARY OF THE INVENTION

It is therefore an object of the present invention to provide a high-output, single-fundamental transverse mode solid state laser which uses a semiconductor laser array as an excitation light source.

The solid state laser according to the present invention is composed of: a laser element which is provided with a core added with an element acting as the laser medium, a cladding not containing such an element, and a reflecting mirror whereby excitation light incident to the cladding is repeatedly reflected back to the cladding surface so that the reflected excitation light beam repeatedly passes through the core; an excitation light source formed by a semiconductor laser or a light emitting diode array; means for directing the excitation light from the light source to the side of the laser element; and a resonator for the oscillation of the solid state laser.

BRIEF DESCRIPTION OF THE DRAWINGS

The present invention will be described in detail below with reference to the accompanying drawings, in which.

DETAILED DESCRIPTION

Embodiment 1

Figure 1:
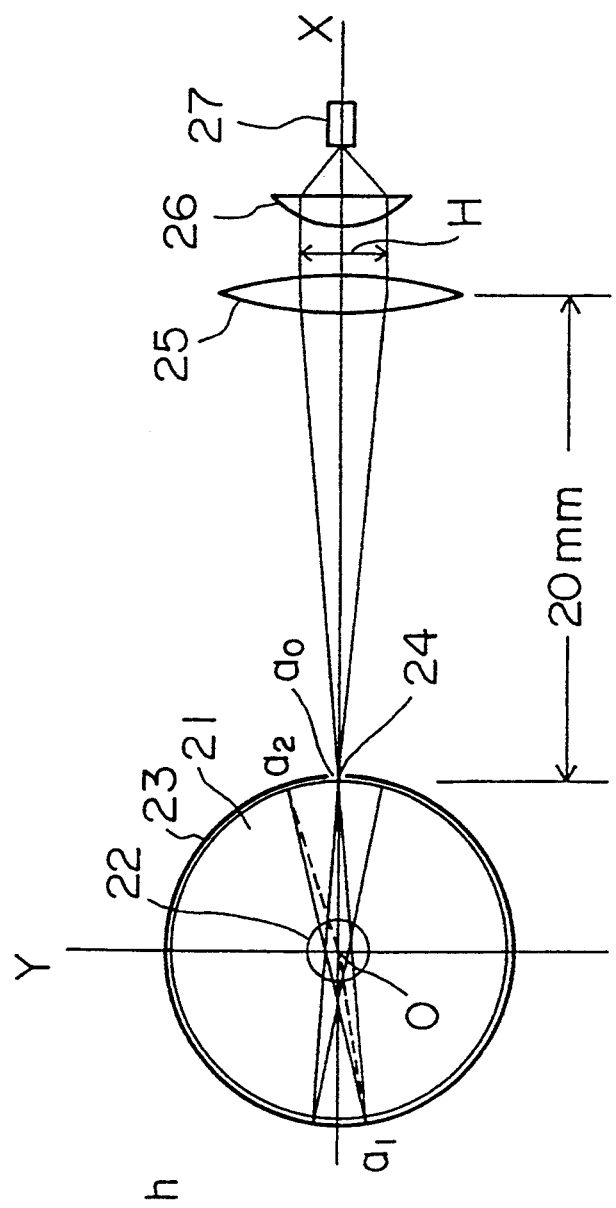
FIG. 1 is a section diagram illustrating an embodiment of the present invention.
Figure 2:
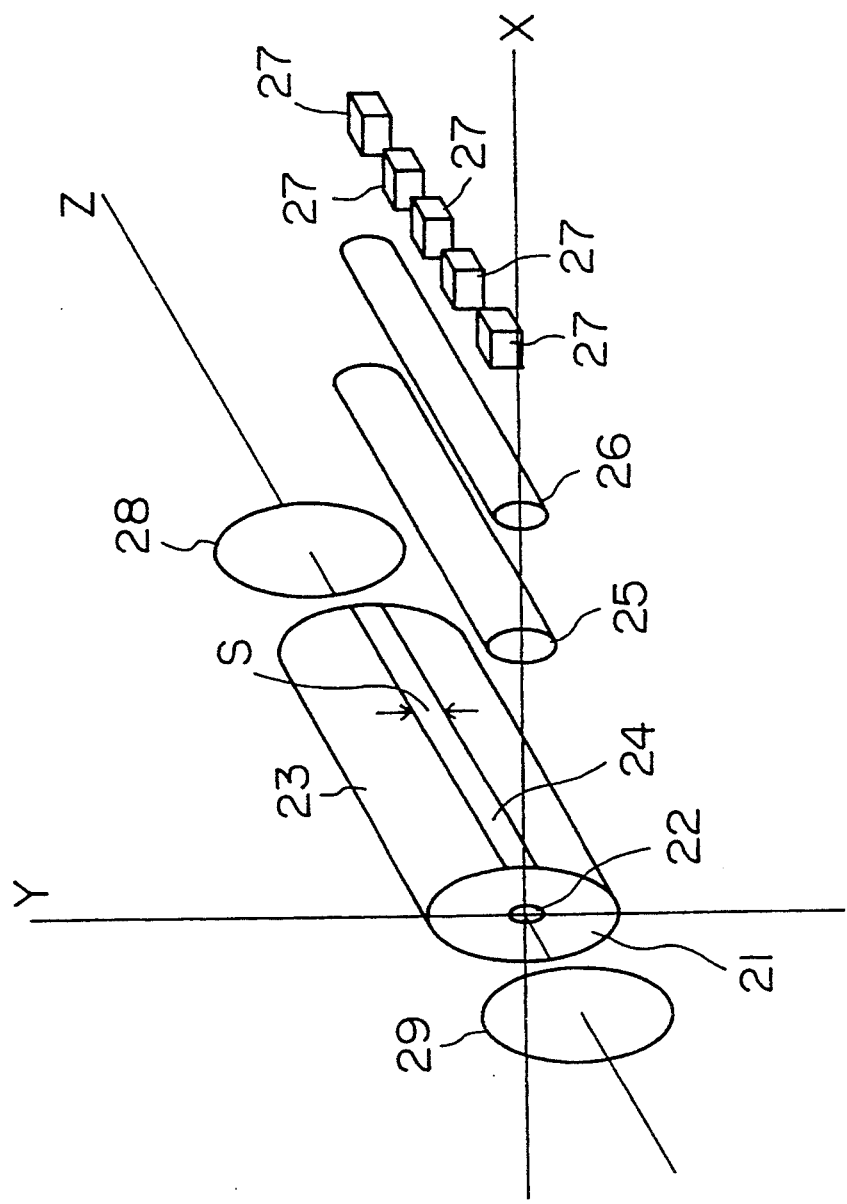
FIG. 2 is a perspective view illustrating the embodiment of the present invention.

FIG. 1 is a front view of a first embodiment of the solid state laser according to the present invention and FIG. 2 its perspective view. The coordinates axes used are rectangular axes. The origin of te XY axis is at the center of each of a cladding and a core and the origin of the Z axis is at an arbitrary point. The axis joining the origin of the XY axis and the junction plane of a semiconductor laser forming an excitation light source will hereinafter be referred to as the X axis and the optical axis of a laser beam of the solid state laser as the Z axis.

The laser element has a 10 mm diameter cladding 21 of a glass composition [$33HfF_4$-$20ZrF_4$-$20BaF_2$-$20NaF$-$4LaF_3$-$3AlF_3$], a 1 mm diameter core 22 disposed concentrically with the cladding and having a glass composition [$53ZrF_4$-$20BaF_2$-$20NaF$-$3LaF_3$-$1NdF_3$-$3AlF_3$] containing neodymium as a laser medium, and a reflecting mirror 23 formed by evaporation metal (silver) onto the surface of the cladding 21 parallel to the Z axis, leaving a 0.2 mm wide slit-like excitation light entrance window 24 in the cladding surface along the XZ plane. The laser element is 60 mm long and columnar in shape.

The excitation light source is formed by semiconductor lasers 27 whose junction planes lie in the x-z plane, and a cylindrical condenser lens 26 of a 5 mm focal length and a cylindrical converging lens 25 of a 20 mm focal length are used as means for focusing excitation light on the surface of the cladding to introducing it into the laser element. Since the cylindrical lenses are used, the excitation light incident to the cladding surface is focused in the Y-axis direction but not in the Z-axis direction; hence, the excitation light on the cladding surface has an intensity distribution corresponding to the far field diffraction angle of each semiconductor laser in the Z-axis direction. In a case where the cladding and the semiconductor lasers are spaced 50 mm apart and the semiconductor lasers are disposed at 10 mm intervals, excitation light is incident to the laser element with substantially uniform intensity all over it.

It is reflecting mirrors 28 and 29 disposed at right angles to the Z axis that constitute a resonator for oscillation of the solid state laser. The reflecting mirror 28 is a concave mirror of a 3 m radius of curvature which has a reflectivity of 99% or more with respect to the wavelength of solid state laser light. The reflecting mirror 29 is a plane mirror which has a transmittivity of 10% with respect to the wavelength of the solid state laser light. The reflecting mirrors, which forms the resonator, are spaced 120 mm apart. The beam waist radius of the resonator (i.e., the radius of the resonator where the beam diameter in the single fundamental mode is minimum) is 0.426 mm.

The operation of this embodiment will be described. For convenience of description, the reflecting mirror at a position where X>0 is defined as an incidence-surface reflecting mirror and the reflecting mirror at a position where X<0 is defined as a reflection-surface reflecting mirror.

In order that excitation light focused on the surface of the cladding 21 and incident thereto may pass through the core 22, the open angle of the incident excitation light needs to be 11.42 degrees or less according to the law of geometrical optics in the case of the core-cladding ratio in this embodiment. Since the refractive index of the cladding 21 is 1.484, the open angle of the incident excitation light needs to be 16.98 degrees or less, that is, the focal length of the converging lens 25 needs to be 12.2 mm or more. Thus, excitation light beams converged by the converging lens 25 all pass through the core 22. The excitation light which has passed through the core 22 is reflected by the reflection-surface reflecting mirror and focused on a point F1 on the X axis, from which it reaches the incidence-surface reflecting mirror. Now, a description will be given of the locus or path of light which enters the laser element at a point $a_0$ on the slit, reflects at a point $a_1$ on the reflection-surface reflecting mirror and reaches a point $a_2$ on the incidence-surface reflecting mirror. Letting the origin of the x-y axis be represented by O, angles $a_0$-$a_1$-O and O-$a_1$-$a_2$ are equal according to the law of reflection. Since the points $a_0$, $a_1$ and $a_2$ are on the same circumference, triangles $a_0$-$a_1$-O and O-$a_1$-$a_2$ are isosceles triangles and they are congruent with each other.

Thus, no matter how many times reflection is repeated, the triangle joining the two reflecting points and the origin is congruent with the triangle $a_0$-$a_1$-O. That is, once a light beam incident to the laser element at the point $a_0$ passes through the core 22, subsequent incident light beams will similarly pass through the core, now matter how many times reflection is repeated; therefore, the energy of incident excitation light is absorbed by the core 22 with high efficiency.

Since the slit 24 for the entrance of excitation light into the laser element is at the center of the incidence-surface reflecting mirror, however, a portion of the reflected light from the reflection-surface reflecting mirror is emitted through the slit 24, and hence is lost. Now, the magnitude of this loss will be evaluated. The intensity distribution $P_{IN}(\theta)$ of incident light is a Gaussian distribution and is expressed by the following equation:

$$P_{IN}(\theta) = P_0 \cdot \exp(-2(\theta/\theta_0)^2) \quad (1)$$

where $\theta_0$ is the open angle.

The total energy Pw of the incident light is approximately expressed by the following equation:

$$Pw \simeq 1.25 P_0 \theta_0 \quad (2)$$

Next, letting the radius of the cladding 21 by represented by R, the light beam reflected on the reflecting place is focused on a point F1 at a distance of 2·R/3 from the reflection surface according to the law of reflection of the concave mirror. Letting the open angle of this reflected light be represented by $\theta_1$, its intensity distribution $P_{REF}(\theta)$ is given by the following equation (3) and its total energy Pw is approximately given by the following equation (4) as is the case with Eq. (2):

$$P_{REF}(\theta) = P_1 \cdot \exp(-2(\theta/\theta_1)^2) \quad (3)$$

$$Pw \simeq 1.25 P_1 \theta_1 \quad (4)$$

Hence, if the loss by reflection is ignored, the following equation (5) will hold between $P_0$ and $P_1$:

$$P_0 \cdot \theta_0 = P_1 \cdot \theta_1 \quad (5)$$

On the other hand, the following equation (6) holds between $\theta_0$ and $\theta_1$:

$$\tan(\theta_1) = 3 \cdot \tan(\theta_0) \quad (6)$$

Moreover, letting the width of the slit 24 be represented by S, the angle $\theta_s$ at which the slit 24 is viewed from the point F1 can be approximately expressed by the following equation (7):

$$\theta_s \simeq 3 \cdot S / 4 \cdot R \quad (7)$$

The light beam which is released from the slit 24 travels back and forth once across the center portion of the core 22 and furnishes thereto its energy. Letting the radius of the core 22 be represented by r, the energy Ps which is released from the core 22 is given by the following equation (8):

$$Ps = \exp(-4 \cdot \alpha \cdot r) \cdot P_1 \cdot \theta_s \quad (8)$$

Then, the absorption coefficient of the core for excitation light in this embodiment is 3.9 cm$^{-1}$ and the energy which is released through the slit 24 and lost is as small as 1.4% of the total energy of the excitation light.

Next, letting the reflectivity of the reflecting mirror be represented by $R_{ref}$, the reflection loss $P_{ref}$ is given by the following equation (9):

$$P_{ref} = Pw \cdot (1 - (1 - \exp(-2\alpha r))/(1 - R_{ref} \exp(-2\alpha r)) \quad (9)$$

The silver-evaporated reflecting mirror in this embodiment has a reflectivity of 98% or more in the vicinity of a wavelength 0.8 μm. Setting $R_{ref} = 0.98$, the reflection loss is around 4% of the total quantity of excitation light.

Hence, the theoretical loss of excitation light in this embodiment is a total of about 5% and approximately 95% of the total energy of the excitation light is absorbed by the core 22.

Then, the inventor(s) of this application prepared a laser element of the sizes mentioned above in this embodiment and checked the ratio in which excitation light would be absorbed by the core. As a result, it was ascertained that the energy of excitation light would be absorbed by the core by more than 90%.

In a laser element which is identical in construction with the laser element of this embodiment but contains 4% erbium as a laser medium, about 90% of the total energy of excitation light is absorbed by the core although the absorption coefficient per unit quantity of erbium added is 1/10 that in the case of neodymium being added.

Embodiment 2

Figure 3:
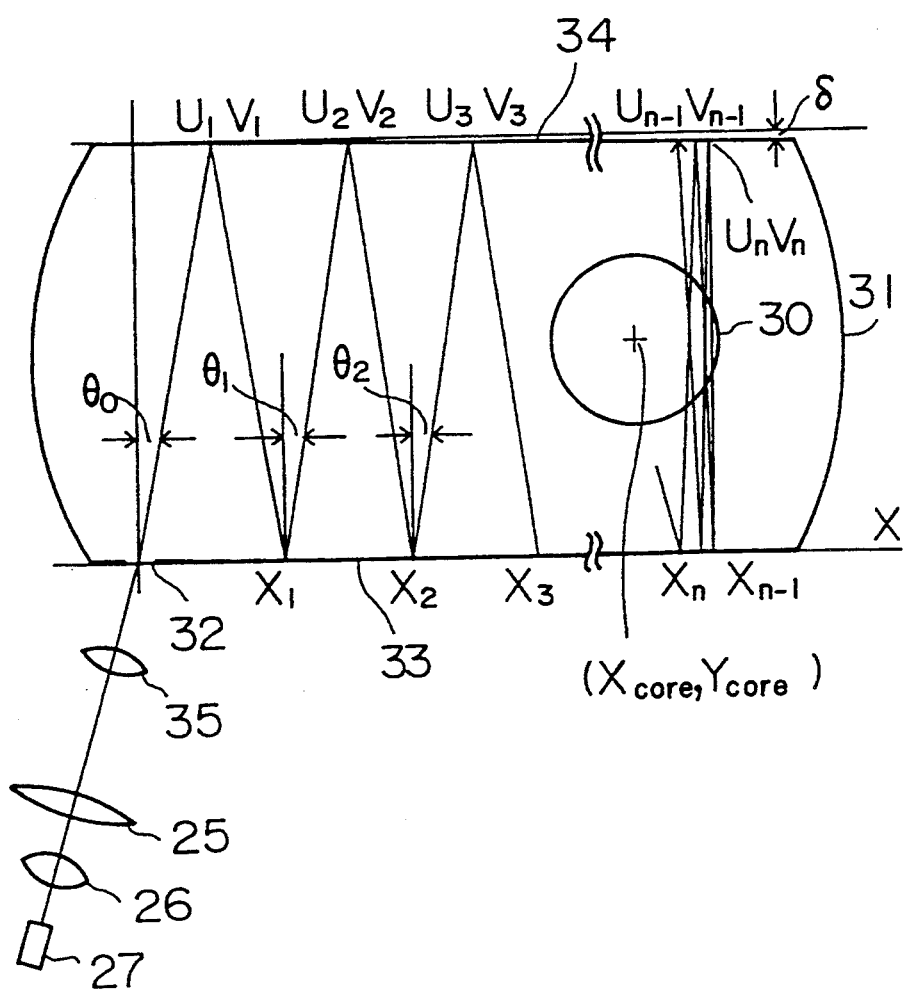
FIG. 3 is a section diagram illustrating another embodiment of the present invention.

FIG. 3 illustrates, in section, a solid state laser according to a second embodiment of the present invention. In the laser element of this embodiment a cladding 31 has a configuration which includes at least one pair of opposed unparallel surfaces, a reflecting mirror 33 for repeatedly reflecting excitation light being formed by evaporating metal (silver) onto the cladding surface in either one of the opposed pair of surface portions while leaving a slit-like excitation light entrance window 32 and a reflecting mirror 34 being formed on the other surface opposite the reflecting mirror 33. A core 30 has its center positioned at about the middle between the two plane mirrors 33 and 34 and at a position shifted to a narrower gap side between the two plane mirrors 33, 34 than a gap therebetween, which is positioned at the center of the slit-like excitation light entrance window 32. As is the case with Embodiment 1, the laser element of this embodiment, which is 60 mm long, is formed by the cladding 31 of a glass composition [33HfF$_4$-20ZrF$_4$-20BaF$_2$-20NaF-4LaF$_3$-3AlF$_3$] and the 1 mm diameter core 30 of a glass composition [53ZrF$_4$-20BaF$_4$-20NaF-3LaF$_3$-1NdF$_3$-3AlF$_3$] containing neodymium as a laser medium.

Semiconductor laser light emitted from the semiconductor laser 27 is provided to the cylindrical condenser lens 26, the cylindrical converging lens 25 and a cylindrical collimator lens 35, from which excitation light is obtained as parallel beams. In this embodiment the open angle of the semiconductor laser light is 40 degrees, the focal length of the condenser lens 26 is 5 mm, the focal length of the converging lens 25 is 100 mm, the focal length of the collimator lens 35 is 5 mm, and the beam widths of the parallel beams are 0.182 mm.

The resonator for oscillation of the solid state laser is not shown in FIG. 3, but as in the case of Embodiment 1, the resonator is formed by a concave mirror of a 3 m radius of curvature which has a reflectivity of 99% or more with respect to the wave length of the solid state laser light and a plane mirror which has a transmittivity of 10% with respect to the wavelength of the solid state laser. The reflecting mirrors which constitute the resonator are spaced 120 mm apart. The beam waist radius of the resonator (i.e. the radius of the resonator where the beam diameter in the single fundamental mode is minimum) is 0.426 mm.

The operation of the solid state laser according to this embodiment will be described. In FIG. 3 the cladding surface where the slit 32 is formed is defined as an incidence surface and the surface opposite the incidence surface is defined as a reflection surface. The coordinates for explaining the operation of this embodiment are rectangular coordinates which have the origin at the center of the light entrance slit and have the X axis coincident with the incidence surface. In such coordinate system, the coordinate of the core center, the radius of the core, the coordinate of the intersection of the incidence surface with the Y axis, the coordinate where the center of excitation light is reflected in the reflection surface, and the coordinate where the center of excitation light is reflected in the incidence surface are represented by $(X_{CORE}, Y_{CORE})$, $r$, $(0, V_0)$, $(U_n, V_n)$ and $(X_n, 0)$ respectively. Incidentally, suffixes n indicates how many times the incident light is reflected in respective surfaces.

Next, the path of excitation light will be described, using these symbols, in the case where the inclination of the reflecting plane to the incidence surface is represented by $\delta$ (where $\delta < 0$) and the angle of incidence of excitation light (i.e. the inclination of excitation light to the normal of the incident plane) is represented by $\theta_0$.

Since the reflection surface is inclined by $\delta$, the incidence angle of excitation light to the reflection surface on the first reflection is $\theta_0 + \delta$ and the incidence angle of the excitation light to the incidence surface after reflection is $\theta_0 + 2\delta$, and hence the angle of reflection therefrom is also $\theta_0 + 2\delta$. Setting $\theta_1 = \theta_0 + 2\delta$, the angle of reflection of the excitation light from the incidence surface on the second incidence thereto is $\theta_1 + 2\delta$. Thereafter the excitation light is repeatedly reflected in a similar manner; therefore, the angle of reflection $\theta_n$ from the incidence surface on an n-th reflection is expressed by the following equation (10):

$$\theta_n = \theta_{n-1} + 2\delta = \theta_0 + 2n\delta \qquad (10)$$

That is, the excitation light propagates in the positive direction on the X axis while at the same time decrementing its angle of reflection by $2|\delta|$ upon each reflection, whereas when the angle $\theta_n$ becomes negative, the excitation light returns in the negative direction on the X axis while at the same time incrementing the absolute value of its incidence angle by $2|\delta|$. The coordinates $X_n$ of the position of reflection on the incidence surface in this case can be obtained from an equation expressing the reflection surface and an equation of the path of light but becomes very complex when n grows large. Yet inclination $\delta$ is sufficiently smaller than $\theta_0$ and $\theta_0$ is also small; hence, the distance $Z_n$ of the movement of the reflection point on the incidence surface upon each reflection on the reflection surface is approximately expressed by the following equation (11), where the unit of angle is radian.

$$\begin{aligned} Z_n &= X_n - X_{n-1} = V_0 \cdot (\tan\theta_{n-1} + \tan\theta_n) \\ &= V_0 \cdot (\theta_{n-1} + (\theta_{n-1} + 2\delta)) \\ &= 2V_0 \cdot (\theta_0 + (2n-1)\delta) \end{aligned} \qquad (11)$$

Therefore, the coordinates $X_n$ of the point of n-th reflection is given by the following equation (12), where the unit of angle is radian.

$$X_n = \sum_{i=1}^{n} Z_i = 2(n\theta_0 + n2\delta)V_0 \qquad (12)$$

The coordinates $X_n$max of the position where the reflection angle of the excitation light on the incidence surface changes from positive to negative is expressed by the following equation (13) on the basis of Eqs. (10) and (12).

$$X_n\max = -V_0\theta_0^2/2\delta \tag{13}$$

Then, if the position of the core is set so that $X_{core}=X_n\max-r$, the excitation light moves in the positive direction on the X axis while being repeatedly reflected on the incidence surface and the reflection surface, and after passing through the core, it moves in the negative direction on the X axis while passing through the core again. The number of reflections $N_0$ of the incident excitation light by the incidence surface until it reaches the core and the number of reflections $N_1$ of the excitation light by the incidence surface during the passage through the core can easily be obtained from Eq. (12) and is expressed by the following equations (14) and (15):

$$N_0 = -(\theta_0 - \sqrt{\theta_0^2 + 2\delta(X_{core} - r)/V_0}/2\delta \tag{14}$$

$$N_1 = N_{max} - N_0 \tag{15}$$

$$= -\sqrt{\theta_0^2 + 2\delta(X_{core} - r)/V_0}/2\delta$$

Thus, the excitation light passes through the core $2 \cdot N_1$ times while being repeatedly reflected by the incidence and reflection surfaces.

The inventor(s) of this application prepared a laser element of a construction wherein the incidence and reflection surfaces were spaced 7.5 mm apart on the Y axis, the two reflection surfaces where inclined 0.34 degrees and the coordinates of the center of the core were (0.8, 3.5) and checked the ratio in which the energy of excitation light would be absorbed by the core when the excitation light was parallel rays of a 0.182 mm beam width, inclined 2.5 degrees to the normal of the slit. As a result, it was found that about 87% of the total energy of excitation light was absorbed by the core. As described above, the energy of excitation light can efficiently be absorbed by the core by repeatedly reflecting the excitation light between two unparallel plane mirrors.

Embodiment 3

Figure 4:
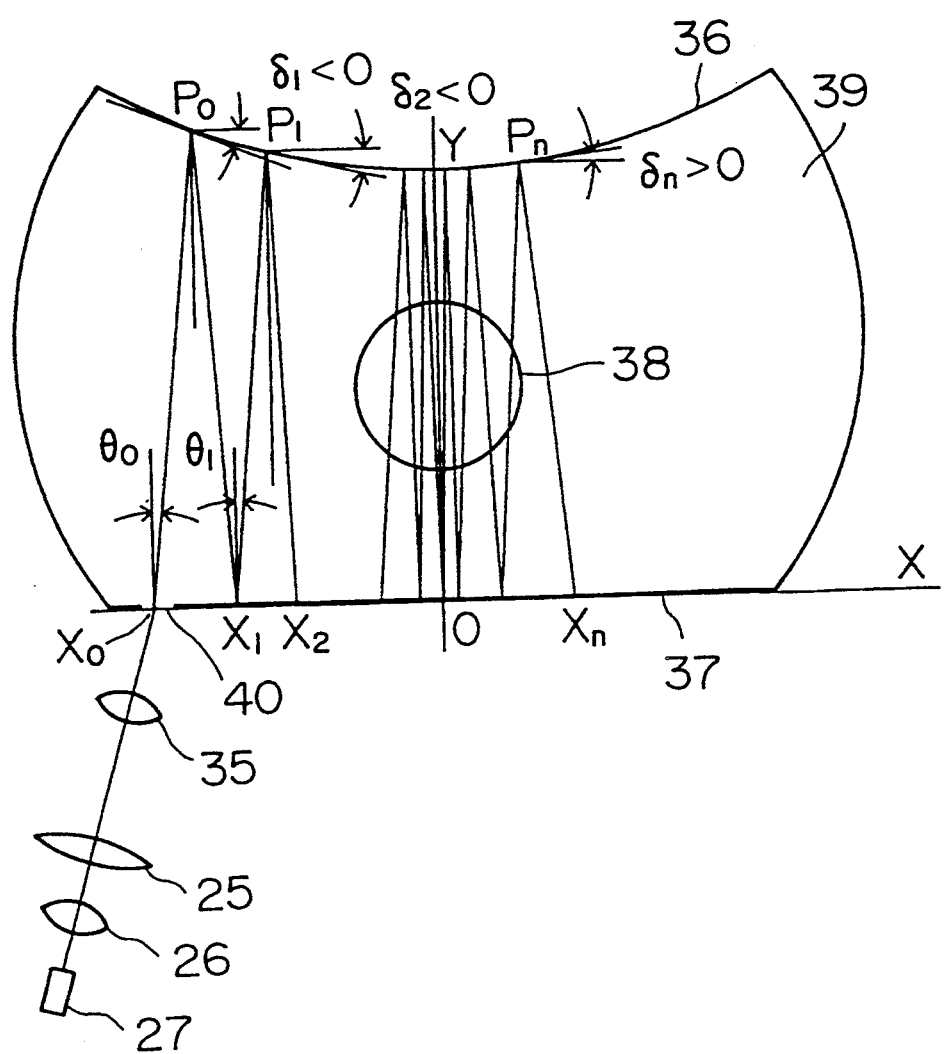
FIG. 4 is a section diagram illustrating another embodiment of the present invention.

FIG. 4 illustrates a solid state laser according to a third embodiment of the invention. This solid state laser is characterized by a construction in which one of two reflecting mirrors for repeatedly reflecting excitation light is formed by a plane mirror, a slit is provided in the plane mirror at a proper position for the incidence thereto of the excitation light, the other reflecting mirror is formed by a convex mirror and a core is disposed which has its center on a perpendicular from the center of curvature of the convex mirror and at about the middle between the plane mirror and the convex mirror. The solid state laser portion which is not shown in FIG. 4 is identical with the corresponding portion of Embodiment 1.

In FIG. 4, reference numeral 36 denotes a convex mirror of a radius of curvature MR, which has its center of curvature on the Y axis, 37 denotes a plane mirror on the X axis, 38 denotes a core which has its center on the Y axis, 39 denotes a cladding, and 40 denotes an excitation light entrance slit, the coordinates of the center of the slit being represented by $X_0$ (where $X_0<0$).

As is the case with Embodiment 1, the laser element of this embodiment, which is 60 mm long, is formed by a cladding of a glass composition [33HfF$_4$-20ZrF$_4$-20BaF$_2$-20NaF-4LaF$_3$-3AlF$_3$] and a 1 mm diameter core of a glass composition [53ZrF$_4$-20BaF$_2$-20NaF-3LaF$_3$-1NdF$_3$-3AlF$_3$] containing neodymium as a laser medium.

Semiconductor laser light emitted from the semiconductor laser 27 is provided to the cylindrical condenser lens 26, the cylindrical converging lens 25 and the cylindrical collimator lens 35, from which excitation light is obtained as a beam of a proper width and a proper converging angle.

Let the points of reflection on the convex mirror be represented by $P_0, P_1, \ldots P_n$, the coordinates of the respective points by $(U_0, V_0), (U_1, V_1), \ldots (U_n, V_n)$, the inclinations of tangential lines of the convex mirror by $\delta_0, \delta_1, \ldots \delta_n$, and the coordinates of the points of reflection on the plane mirror by $X_1, X_2, \ldots X_n$. Excitation light incident from the center $X_0$ of the slit at an angle $\theta_0$ is reflected at the point $P_0$, and the angle of reflection $\theta_1$ of the excitation light at the time of being reflected again at the point $X_1$ is given by the following equation (16) and the angle of reflection $\theta_n$ at the point $X_n$ is given by the following equation (17), where $\theta_{n-1}$ is the angle of reflection at the point $X_{n-1}$ and $\delta_{n-1}$ is the inclination angle of the reflecting mirror at the point $P_{n-1}$.

$$\theta_1 = \theta_0 + 2\cdot\delta_0 \tag{16}$$

$$\theta_n = \theta_{n-1} + 2\cdot\delta_{n-1} \tag{17}$$

These equations are identical in form with the equations in Embodiment 2, but owing to the property of the convex mirror, the inclination of the reflection surface is maximum at the point of incidence of the excitation light and the inclination angle decreases upon each reflection though the sign is minus as in the case of Embodiment 2. When the point of reflection shift to the positive side, the inclination of the reflection surface reverses, that is, turns positive or plus, and the inclination angle increases upon each reflection. Hence, the inclination $\delta$ of the reflection surface decreases as the point of reflection approaches the Y axis and the density of the excitation light which passes through the core increases as the center of the core is approached.

The description given above is true of the locus of the center of the excitation light beam, but since the reflecting mirror forming the reflection surface is a convex mirror in this embodiment, the beam width will increase upon each reflection if parallel rays are incident as the excitation light. To prevent the expansion of the beam, the incident beam is made convergent by the collimator lens 34 to cancel or offset the expansion of the beam by the convex mirror in this embodiment.

More specifically, a laser element was prepared which had a construction in which the both reflecting mirrors were spaced 7.5 mm apart, the radius of curvature of the convex mirror was 35 mm, the point of incidence was 0.8 mm and the incidence angle was fixed to 2.5. An optical system for the incidence of excitation light was used which includes a semiconductor laser with an output light open angle of 40 degrees, the condenser lens 26 of a 5 mm focal length, the converging lens 25 of a 100 mm focal length and the collimator lens 34 of a 7 mm focal length. The ratio of the absorption of the excitation light energy by the core was checked while adjusting the spacing between the converging lens 25 and the collimator lens 34 and the spacing between the collimator lens 34 and the slit 40. As the result of this, it was found that 82% or more of the total energy of the excitation light was absorbed by the core.

Embodiment 4

Figure 5:
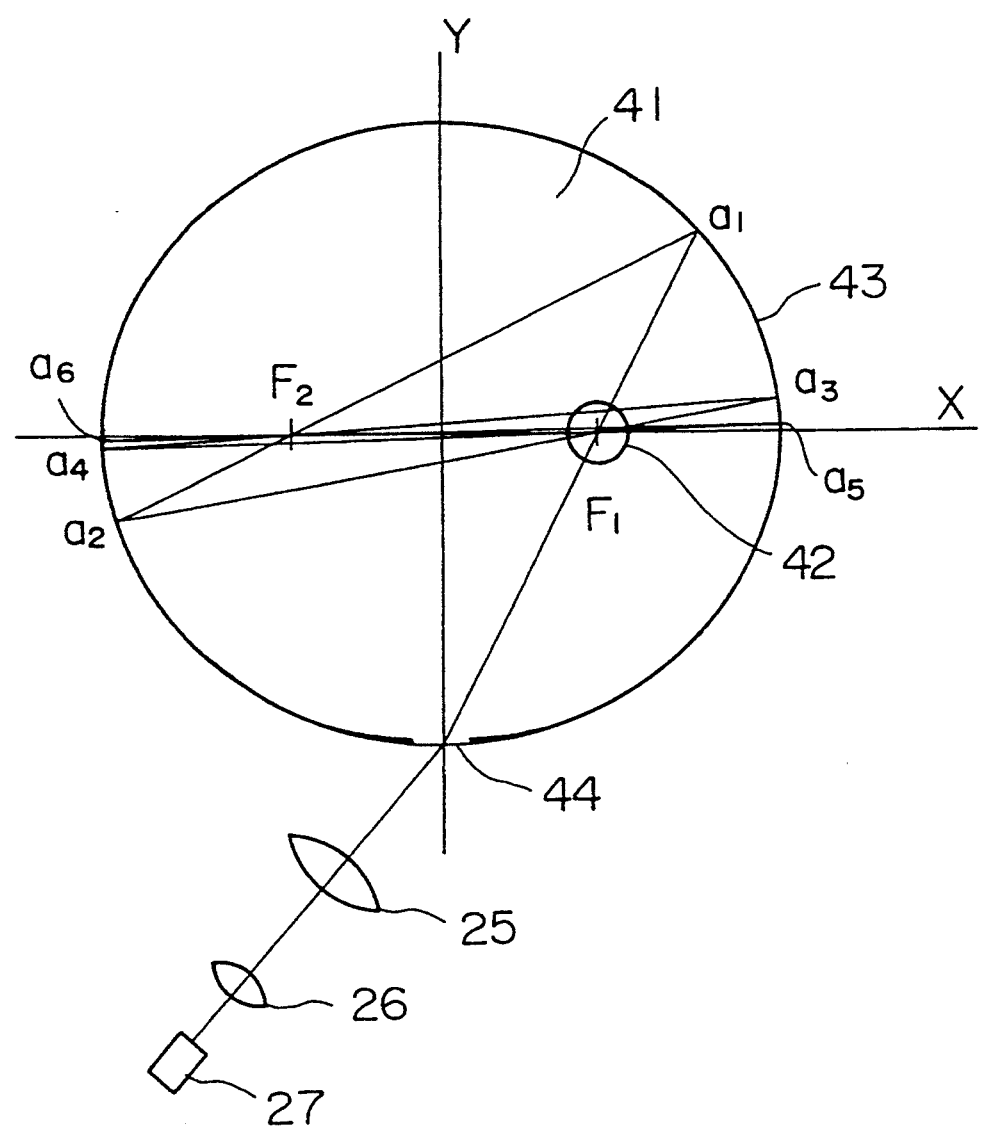
FIG. 5 is a section diagram illustrating another embodiment of the present invention.

FIG. 5 illustrates a solid state laser according to a fourth embodiment of the invention. The solid state laser of this embodiment is characterized by a construction wherein the cladding is an elliptic cylinder, the core is disposed at the position of one of focuses of the elliptic cylinder and the reflecting mirror is formed on the cladding surface, leaving an excitation light entrance slit, and wherein excitation light is introduced through the slit in a manner to pass through either one of the focuses of the elliptic cylinder and is repeatedly reflected by the reflecting mirror so that it passes through the core. The solid state laser portion which is not shown in FIG. 5 is the same as that in Embodiment 1.

In FIG. 5, reference numeral 41 denotes an elliptic cylindrical cladding, 42 a core having its center at one of the focuses of the elliptic cylinder, 43 a reflecting mirror formed over the cladding surface, and 44 an excitation light entrance slit. Reference characters $F_1$ and $F_2$ indicate the positions of focuses of the ellipse.

As is the case with Embodiment 1, the laser element of this embodiment, which is 60 mm long, is formed by the cladding of a glass composition [33HfF$_4$-20ZrF$_4$-20BaF$_2$-20NaF-4LaF$_3$-3AlF$_3$] and the 1 mm diameter core of a glass composition [53ZrF$_4$-20BaF$_2$-20NaF-3LaF$_3$-1NdF$_3$-3AlF$_3$] containing neodymium as a laser medium.

Light emitted from the semiconductor laser array 27 is provided to the cylindrical condenser lens 26 and the cylindrical converging lens 25, from which is obtained a light beam of a proper beam width and a proper converging angle.

In this embodiment, the excitation light, which is incident at a point $a_0$ in the slit 44 and passes through the focus $F_1$ in the core, is reflected by the reflecting mirror at a point $a_1$ on the cladding surface and passes through the other focus $F_2$, thereafter being reflected at a point $a_2$. The light reflected at the point $a_2$ again passes through the focus $F_1$ in the core and is reflected at a point $a_3$. That is, light which passes through focuses of a reflecting mirror formed over an elliptic surface passes through either one of the focuses each time it is reflected. Hence, all the energy of incident excitation light, except the reflection loss, is absorbed by the core.

In order that excitation light incident at a proper position in an ellipse may be focused on one focus of the ellipse, the incidence angle of the excitation angle, the converging lens and the position of incidence need only to be adjusted so that the focus position of a compound lens, which is a combination of a lens having its focal length defined by the refraction index and curvature of the ellipse at the position of incidence and the converging lens, comes into agreement with the focus position of the ellipse.

The laser element according to this embodiment was prepared which had a 1 mm diameter core disposed at the position of one of focuses of an ellipse 10 mm in major axis and 9 mm in minor axis, and the ratio in which excitation light incident through a slit provided about the Y axis would be absorbed by the core was checked. As the result of this, it was found that about 90% of the excitation light was absorbed by the core.

Embodiment 5

A description will be given of a method for forming the core-cladding structure according to Embodiment 5.

The core-cladding structure wherein the core containing a laser medium is covered with the cladding containing no laser medium—which is one of the features of the laser element according to the present invention—is technically difficult to obtain in the case of using, as a laser material, crystals such as YAG (Yttrium-Aluminum-Garnet).

In case of using glass as the laser material, however, it is possible to utilize an optical fiber preform technique. For example, in the case of using a fluoride glass laser preform for the laser elements in Embodiments 1 through 4, it is possible to fabricate a preform of a core-cladding structure having a proper ratio between the core and cladding diameters, by a tubular crucible method disclosed in a literature (Norimatsu et al., IOOC 89, 4.44 (1989)) or preform technique proposed by Mimura et al. (Japanese Pat. Appln. No. 28668/90).

In case of using glass other than the fluoride glass as the laser material, the known optical fiber preform technique can be used; in case of using quartz glass as the laser material, the core containing a laser medium can be formed by a CVD method (a Chemical Vapor Deposition method); and when the CVD method cannot be utilized as in the case of phosphate glass, a rod-in-tube method (a method by which a pipe of cladding glass and a rod of core glass inserted therein are fusion welded by heating) can be employed.

Hence, by using, as the cladding glass, glass containing no laser medium element and transparent to excitation light and using, as the core glass, glass containing a laser medium, it is possible to obtain a laser element wherein incident excitation light is absorbed only by the core.

While neodymium (Nd) has long been well-known as a laser medium, there have also been known solid state lasers using, as laser media, light rare earth elements such as erbium (Er), holmium (Ho) and thullium (Tm). In the present invention, these laser medium can be used arbitrarily. When the laser material is glass, it is possible to fabricate a laser element having the core-cladding structure as mentioned above, but in the case of glass of the oxide systems such as quartz glass, the transmittivity of light in the infrared region is so low that laser oscillation in the infrared region above a 1.7 μm wavelength, and in the case of the quartz glass, the amount of laser medium added is limited, making it impossible to form a core which contains a laser medium at a high concentration.

In contrast thereto, the fluoride glass is high in its transmittivity of light in the infrared region and permits laser oscillation in the infrared region above the 1.7 μm wavelength as well; in addition, the fluoride glass suppresses the absorption of light by phonons, and hence provides a high light emitting efficiency.

Embodiment 6

The use of the fluoride glass as the laser material has a defect that the atmospheric resistance of the laser element is lower than in case of using the oxide glass as the laser material. This is attributable to the fact that the fluoride glass is easier to crystallize than the oxide glass.

The crystallization of the fluoride glass is caused by the growth of a crystal which uses, as its nucleus or seed, an oxyfluoride or oxide resulting from the chemical reaction shown by the following equation (18):

$$M^{+4}F_4 + \tfrac{1}{2}O_2 \rightarrow M^{+4}OF_2 + F_2$$

$$M^{+4}F_4 + O_2 \rightarrow M^{+4}O_2 + 2F_2 \qquad (18)$$

In the above, $M^{+4}$ is a quadrivalent positive ion.

This reaction does not usually take place at low temperatures. If water is present, however, the reaction gradually proceeds even at low temperatures; furthermore, if irradiated by light of high intensity, the reaction is accelerated. Hence, to prevent deterioration by the crystallization of the fluoride glass, it is necessary to form a highly moisture-resistant protective film which keeps the fluoride glass surface from contacting water in the atmosphere. As highly moisture-resistant films there are known dielectric thin films of magnesium fluoride, cerium fluoride, etc. other than metallic films. In particular, there has already been disclosed a technique whereby the reflectivity of a material of a proper refractive index is set to a proper value between 0 to 100% with respect to a proper wavelength by the use of a multilayer film having dielectric thin films formed in layers. According to this embodiment, the surface of a laser element which uses the fluoride glass as its laser material is covered with a thin film formed by the protective film forming technique to increase the reliability of the solid state laser and improve its characteristic.

Embodiment 7

Figure 6:
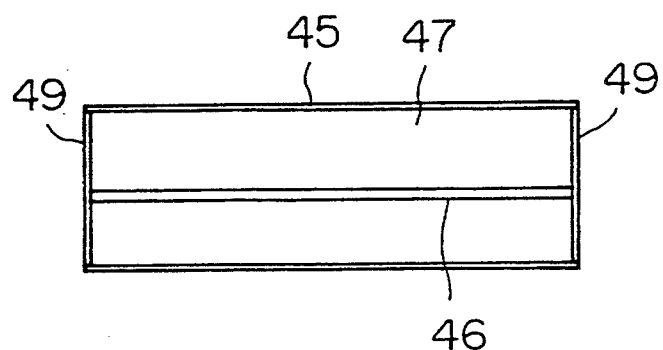
FIG. 6 is a longitudinal section illustrating another embodiment of the present invention.
Figure 7A:
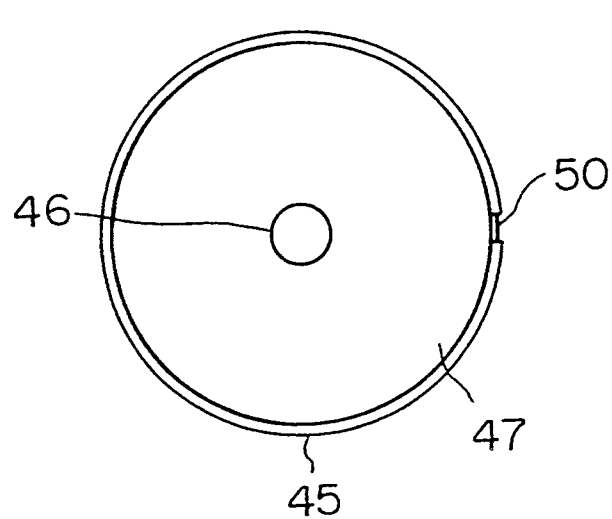
FIGS. 7A and 7B are cross sections illustrating other embodiments of the present invention.
Figure 7B:
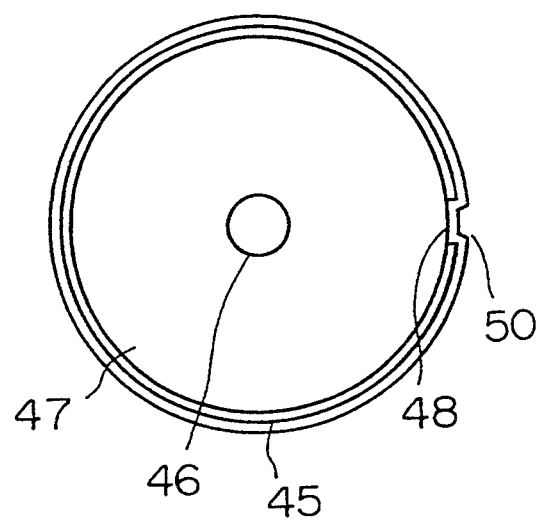

FIG. 6 is a sectional view parallel to the optical axis of laser light, illustrating a solid state laser according to a seventh embodiment of the invention. FIGS. 7A and 7B are sectional views at right angles to the optical axis. FIG. 7A shows a case where an anti-reflection film is provided only in the excitation light entrance window and FIG. 7B a case where the anti-reflection film is formed over the entire area of the peripheral surface of the laser element. Reference numeral 46 denotes a core, 47 a cladding, 49 an anti-reflection film formed on each end face of the laser element and having a low reflectivity with respect to solid state laser light, and 50 an anti-reflection film having a low reflectivity with respect to excitation light. This embodiment is characterized in that since the laser element is covered all over its peripheral surface with a metallic reflecting film 45 for reflecting excitation light and the anti-reflection film 50 formed in the slit for preventing the reflection of the excitation light and since the end faces of the laser elements are covered with the films for preventing solid state laser light, the fluoride glass surface will not be exposed directly to the atmosphere. Moreover, when the anti-reflection film is formed over the entire area of the peripheral surface of the laser element as depicted in FIG. 7B, it will protect the excitation light reflecting film 45, increasing the reliability of the solid state laser.

Figure 10A:
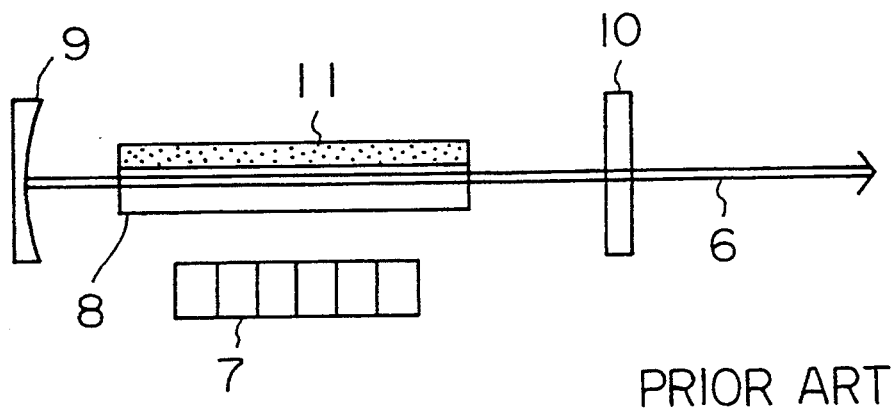
FIGS. 10A and 10B are a side view and a cross-section schematically illustrating in combination the construction of a conventional solid state laser.
Figure 10B:
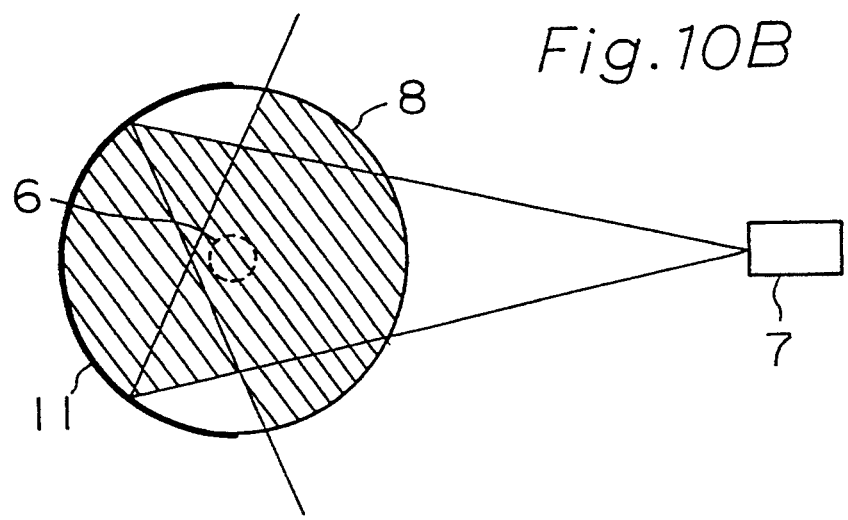

Furthermore, the laser element of the structure shown in FIG. 6 is higher in the efficiency of laser oscillation than the conventional laser element of the structure depicted in FIG. 10. That is, the reflectivity of light on the surface of the fluoride glass is about 4%, but the reflectivity on the end fence and the excitation light incidence surface of the laser element is reduced substantially to zero by the anti-reflection films 49 and 50; so that loss between resonators is reduced about 8% and the intensity of excitation light is enhanced about 10%.

Embodiment 8

Figure 8:
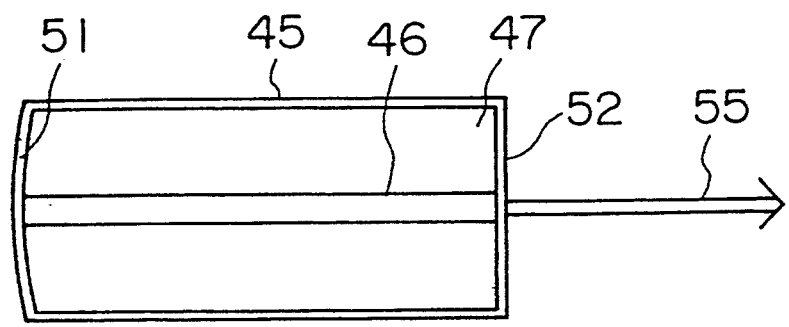
FIG. 8 is a longitudinal section illustrating another embodiment of the present invention.

FIG. 8 illustrates, in section, a solid state laser according to an eight embodiment of the present invention in which the reflecting mirrors 28 and 29, which form a resonator of the solid state laser of the embodiment of FIG. 1, are formed on the laser element surface. Reference numeral 51 denotes a concave mirror which is formed by a metallic thin film or dielectric multilayer film and has a high reflectivity with respect to solid state laser light 55, and 52 a plane mirror formed by a dielectric multilayer film which has a proper transmittivity with respect to the solid state laser light. Since the reflecting mirrors forming the resonator of the solid state laser are formed directly on the laser element surface, the reflecting mirrors themselves serve as fluoride glass protective films. While high accuracy is needed for the fabrication of the laser element, the solid state laser of this embodiment is entirely free from reflection loss between the resonator and the laser element and high in oscillation efficiency and this laser is very simple in construction and high in mechanical reliability.

Embodiment 9

Figure 9:
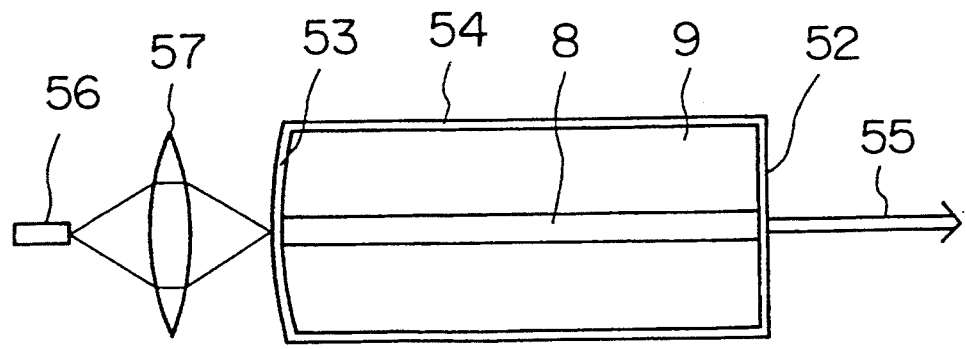
FIG. 9 is a longitudinal section illustrating still another embodiment of the present invention.

FIG. 9 illustrates another embodiment of the invention, in which the concave mirror forming the resonator of the laser in Embodiment 8 is formed by a dielectric multilayer film 53 which has a high transmittivity with respect to excitation light and a high reflectivity with respect to solid state laser light. The laser of this embodiment is exactly identical in function with the laser of Embodiment 8 in the case where the laser element is excited by excitation light incident through a slit formed in its peripheral surface.

In this embodiment, however, since one of the reflecting mirrors forming the resonator has a high transmittivity with respect to the excitation light, it is also possible to employ a structure in which the excitation light is incident thereto on one end face to induce laser oscillation. That is, what is shown in FIG. 9 is a solid state laser of the type that the laser oscillation is induced by excitation light incident to the laser element from its one end face. Reference numeral 56 denotes a semiconductor laser as an excitation light source, 57 an optical system for converging excitation light, 52 a reflecting mirror having a proper transmittivity with respect to laser light as in Embodiment 2, 53 reflecting mirror which is one of the two reflecting mirrors forming a resonator and is formed by a dielectric multilayer film having a high transmittivity with respect to excitation light and a high reflectivity with respect to the laser light, and 54 a moisture-resistant protective film. Since this solid state laser is an end face excitation type laser, there is a limit to increasing its output, but since its laser element has a wave guide structure, the excitation light propagates only in the core and hence is efficiently absorbed by the core. Thus, according to this embodiment, it is possible to obtain a solid state laser which is high in excitation efficiency, simple in construction and small in size.

The solid state laser according to the present invention is formed by a core containing a laser medium and a cladding with no laser medium and has a construction wherein incident excitation light is repeatedly reflected by reflecting mirrors formed on the cladding surface so that it repeatedly passes through the core. Hence, the energy of the excitation light is efficiently absorbed by the core, and consequently, the oscillation efficiency of the laser is very high. Moreover, since the core-cladding structure is used, the laser is impossible of multimode oscillation even if the energy of excitation light is increased. Thus, the present invention permits implementation of a high-output, single fundamental mode solid state laser.

The method for producing the laser element of the solid state laser of the present invention is basically identical with an optical fiber preform fabrication process. The laser element of the type having the core and cladding disposed concentrically can be obtained only by forming on one side of a preform a coating layer having a high reflectivity with respect to excitation light while leaving an excitation light entrance window. Thus, the solid state laser of the present invention can easily be fabricated by a very simple process.

The fabrication of the laser element structures of Embodiments 2 through 4 involves a step for shaping the form of the cladding, but limitations imposed on the preform technique, such as the circularity or roundness of the cladding and the eccentricity, are raised, making it possible to implement the solid state laser of the present invention.

The solid state laser of the type wherein the laser element made of fluoride glass is covered all over its surface with a metallic or dielectric thin film is free from the deterioration by the reaction of the laser element with oxygen or water content in the atmosphere which is a defect of the conventional solid state laser using the fluoride glass for the laser element. Thus, the solid state laser of this type is highly reliable. Moreover, the dielectric thin film coated over the surface of the laser element prevents the reflection loss of laser light and excitation light on the surface of the laser element, increasing the oscillation efficiency of the laser.

As described above, the solid state laser of the present invention is a high-output, single fundamental mode laser which oscillates efficiently, and therefore, the present invention has considerable repercussions in the field of precision machining or the like which calls for high-output, single fundamental mode laser light.

A description will be given of the effect which is produced by using the fluoride glass as a laser material. In a conventional solid state laser using an oxide crystal or glass as the laser material, the infrared transmittivity of the laser material abruptly drops for light of a wavelength above 1.5 $\mu$m. Hence, this laser is allowed to oscillate at a wavelength near 1.5 $\mu$m at the longest in the infrared region.

In contrast thereto, the transmittivity of the fluoride glass for light of the infrared region is 95% or more for light up to 3.5 $\mu$m in the case of the ZBLAN glass used in the embodiments, and glass which does not contain any element such as aluminum (Al) or sodium (Na) is poor in stability but permits the passage therethrough of infrared rays of longer wavelengths.

Hence, the solid state laser of the present invention is capable of oscillation in the infrared region covering a 2 to 3.5 $\mu$m band over which the conventional solid state laser of the type using the oxide as the laser material is incapable of oscillation.

In the infrared region ranging from 2.5 to 3.5 $\mu$m, in particular, there are absorption bands by molecular oscillation of low molecular weight materials such as carbon monoxide, carbon dioxide, nitrogen oxides and methane gas, and solid state lasers which oscillates in these wavelength regions are effective as light sources for spectral analysis of these materials, and hence are of great industrial value.

What we claim is:

1. A high-output solid state laser of single functional mode of laser light comprising,
    a high efficiency cylindrical laser glass rod core containing an element added as a laser medium and a cylindrical glass cladding disposed circumferentially of said rod core and longitudinally thereof concentrically therewith;
    said glass cladding being free of an element acting as a laser medium and defining a narrow slit along a length thereof as an entrance window for excitation light to pass therethrough for incidence on said rod core along an optical axis thereof;
    a source of said excitation light and means for focusing the excitation light on the surface of said glass cladding;
    high incident light reflecting mirror surfaces formed on said glass cladding disposed for defining said narrow slit and for reflecting continuously excitation light passing through said rod core back accurately through the optical axis of the core so that incident light is accurately repeatedly reflected to the optical axis of the rod core for high efficiency absorption of the incident excitation light; and
    an optical resonator for developing laser oscillations along the optical axis of said rod core.

2. A solid state laser according to claim 1, in which said optical resonator comprises a first reflecting mirror having a concave reflector surface and a second reflecting mirror having a flat reflector surface spaced coaxially from each other.

3. A solid state laser according to claim 2, in which said first and second reflecting mirror of said optical resonator are formed on opposite ends of said cladding.

4. A solid state laser according to claim 1, in which said incident light reflecting mirror surfaces are disposed circumferentially and axially of said slit, and said slit is disposed in the center of the incident light reflecting mirror surfaces to reduce loss of reflected excitation light through said slit.

5. A solid state laser according to claim 1, in which said rod core and said cladding are made of fluoride glass, and surfaces of the cladding not constituting said incident light reflecting mirror surfaces are coated with a moisture-resistant film of low reflectivity.

6. A solid state laser according to claim 5, capable of oscillation in the infrared wavelength regions in the range of absorption bands of low molecular weight gaseous materials such as carbon monoxide, carbon dioxide, nitrogen oxides and methane gas for spectral analysis of said materials.

* * * * *